United States Patent [19]

Takeuchi et al.

[11] Patent Number: 5,072,375
[45] Date of Patent: Dec. 10, 1991

[54] MICROCOMPUTER SUPPORTING SELECTIVE ANALOG-TO-DIGITAL CHANNELS FOR CONVERSION

[75] Inventors: Minoru Takeuchi; Kenji Kubo, both of Itami, Japan

[73] Assignee: Mitsubishi Denki Kabushiki Kaisha, Tokyo, Japan

[21] Appl. No.: 540,549

[22] Filed: Jun. 19, 1990

[30] Foreign Application Priority Data

Dec. 11, 1989 [JP] Japan ................................. 1-321789

[51] Int. Cl.⁵ ............................................. G06F 3/00
[52] U.S. Cl. .................................... 395/800; 364/238; 364/260.4; 364/260.9; 364/926.2; 364/939.3; 364/DIG. 1; 364/DIG. 2
[58] Field of Search .............................. 364/200, 900

[56] References Cited

U.S. PATENT DOCUMENTS 3,582,901  6/1971  Cochrane et al. ................. 364/900
3,599,161  8/1971  Stoughton et al. ............... 340/172.5
3,761,889  10/1973  Hallee et al. ...................... 340/172.5
4,631,662  12/1986  Stutler et al. ....................... 364/200
4,654,632  3/1987  Yoshida et al. ............... 340/347 AD
4,901,275  2/1990  Hardie et al. ..................... 364/900
4,918,647  4/1990  Downey et al. .................. 364/900

OTHER PUBLICATIONS

NEC Data, PD78312CW/G (8 Bits MCU).
Mitsubishi M37700 (16 Bits MCU), Manual.
Motorola N68HC11 (MCU), Manual.
Sony CXP80116 (MCU), Manual.
Intel MCS-96 Family.

Primary Examiner—Michael R. Fleming
Assistant Examiner—Robert S. Hauser
Attorney, Agent, or Firm—Townsend and Townsend

[57] ABSTRACT

Both selection information for designating one of analog signal input terminals and timing information for designating the timing for starting A/D conversion with respect to the selected analog signal input terminal are inputted into a microcomputer which incorporates an A/D converter. The selection information for A/D conversion and a conversion start signal are generated in response to the inputted selection information and timing information so that any of analog signals varying with the time to a relatively large extent can be converted into digital signal.

4 Claims, 20 Drawing Sheets (TIMING FOR NORMAL OPERATION)

(TIMING FOR ABNORMAL OPERATION)

MICROCOMPUTER SUPPORTING SELECTIVE ANALOG-TO-DIGITAL CHANNELS FOR CONVERSION

BACKGROUND OF THE INVENTION

1. Field of the Invention

The present invention relates to microcomputers which are able to convert analog signals to digital signals.

2. Description of the Prior Art

A conventional A/D converter incorporated microcomputer, which is able to convert a relatively stable analog signal, such as temperature, inputted from an external circuit (provided on the side of the measured), into a digital signal and carries out a required process, is shown in FIG. 17. The microcomputer 18 has four analog signal input terminals 2a-2d for receiving four analog input signals 1a-1d; a selector 3 for selecting one of the analog signal input terminals 2a-2d and outputting the selected analog signal 4; an A/D converter 5 for converting the analog signal 4 into a digital signal 8 (having a number of bits corresponding to the resolution); a reference voltage input terminal 7 for receiving a reference voltage 6 for use in A/D conversion; four storage units or registers 9a-9d for holding the digital signal 8 corresponding to the selected analog input terminal; a central processing unit (CPU) 12; an internal bus 10 for carrying information between the registers 9a-9d and the CPU 12; and a control circuit 13d for controlling the selector 3 with a selection information or 2-bit coded digital signal 14, the A/D converter 5 with an A/D conversion start signal 15, and the registers 9a-9d with latch signals 1a-1d and receiving an A/D conversion finish signal from the A/D converter 5.

In operation, in response to the selection information 14 generated by the control circuit 13d, the selector 3 selects one of the analog signals 1a-1d inputted at the analog input terminals 2a-2d and outputs the selected signal 4 to the A/D converter 5. In response to the A/D conversion start signal 15 from the control circuit 13d, the A/D converter 5 converts the analog signal 4 into a digital signal 8 with reference to the reference voltage 6 inputted to the reference voltage input terminal 7 and outputs, upon completion of the conversion, both an A/D conversion finish signal 19 to the control circuit 13d and the digital signal 8 to the registers 9a-9d. In response to the latch signal 11a-11d outputted by the control circuit 13d corresponding to the selected analog signal input terminal 2a-2d, the register 9a-9d holds the digital signal 8. The CPU 12 outputs a read command to one of the registers 9a-9d via the internal bus 10, and the selected register sends its contents to the CPU 12. Thus, the control circuit 13d generates and outputs the selection information 14 and the A/D conversion start signal 15 to the selector 3 and the A/D converter 5, respectively, and receives the conversion finish signal 19 from the A/D converter 5, and then outputs the latch signal 11a-11d to one of the registers 9a-9d corresponding to the selection information 14 for holding the digital signal 8.

FIGS. 18 and 19 show the operation of the conventional microcomputer, wherein like reference characters denote like or corresponding parts of FIG. 17. In response to the conversion start signal 15, the A/D converter 5 converts the analog input signals 1a-1d into digital signals 8a-8d. In response to digital selection signals 14a-14d, the selector 3 selects respective analog signal input terminals 2a-2d.

As shown in FIG. 18, when changes of the analog input signals 1a-1d are relatively small, it is possible to convert the analog input signals 1a-1d into digital signals without losing much information.

As shown in FIG. 19, when changes of the analog input signals 1a-1d are large, it is necessary to not only synchronize the A/D conversion start signal 15 with the timing indicated by the hatching at which the analog input signals 1a-1d are to be converted into digital signals but also match the selection information 14 generated by the also match the selection information 14 generated by the microcomputer 18 with one of the analog signal input terminals 2a-2d to be selected (or the analog input signal to be converted).

Consequently, it is only possible to perform A/D conversion for analog signals varying with the time to a relatively large extent with the timing and selection information that are generated within the microcomputer, thus failing to provide a flexible A/D conversion capability without losing much information.

SUMMARY OF THE INVENTION

Accordingly, it is an object of the invention to provide a microcomputer capable of performing A/D conversion of a plurality of analog signals which vary with time to relatively large extent.

According to the invention there is provided a microcomputer which includes an input unit for receiving selection information for designating one of a plurality of analog signal input terminals and timing information for designating the timing for starting A/D conversion for the selected analog signal input terminal and a control unit responsive to the selection information and timing information to output selection information to the selection unit and a conversion start signal to the A/D converter, whereby even if a plurality of analog signals varying with the time to relatively large extent are applied to the analog signal input terminals, by applying the selection information and the timing information to the control unit via input unit, it is possible to perform A/D conversion of the analog signals with given timing.

The above and other objects, features, and advantages of the invention will become more apparent from the following description when taken in conjunction with the accompanying drawings.

DESCRIPTION OF THE PREFERRED EMBODIMENT

Figure 1:
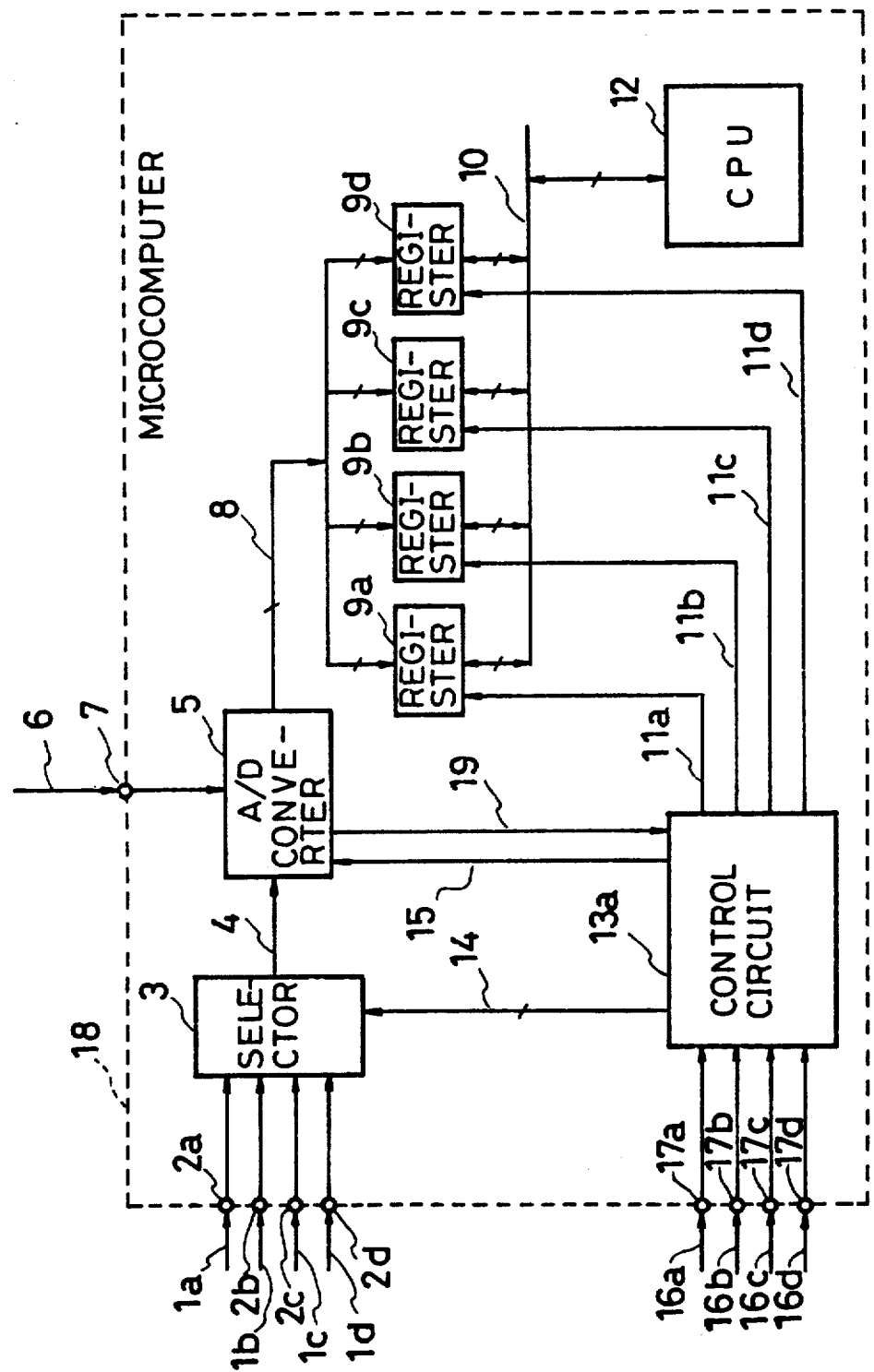
FIG. 1 is a block diagram of a microcomputer according to an embodiment of the invention.
Figure 17:
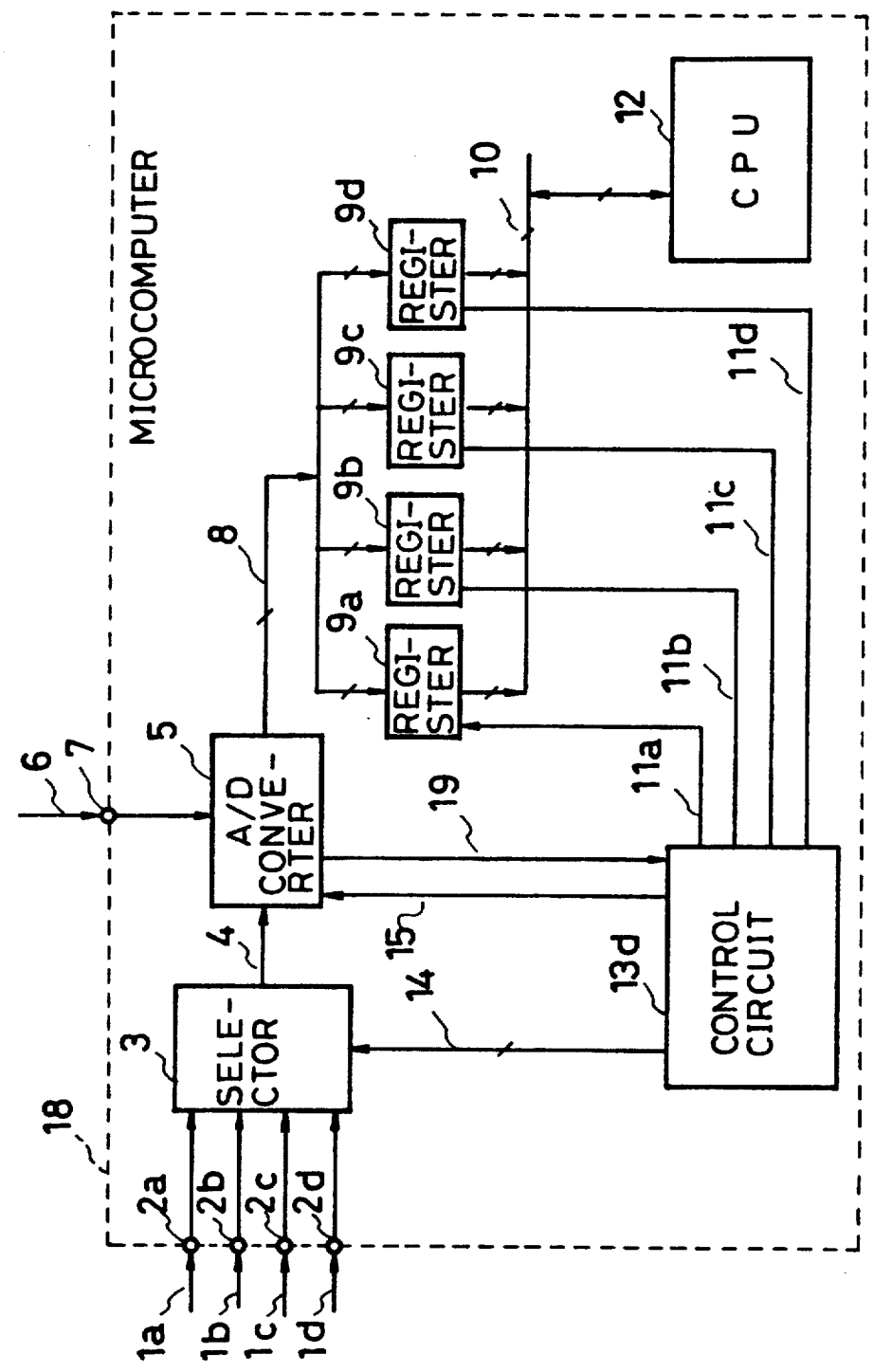
FIG. 17 is a block diagram of a conventional microcomputer.

In FIG. 1, like reference characters denote like or corresponding parts of FIG. 17, and their description will be omitted. The microcomputer 18 has four external trigger input terminals 17a-17d for receiving four external trigger signals 16a-16d which represent selection and timing information. The external trigger signals 16a-16d and input terminals 17a-17 correspond to the analog input signals 1a-1d and input terminals 2a-2d, respectively. The external trigger signals 16a-16d are generated by an external circuit (or source of the analog input signals 1a-1d) by means of a differentiation circuit or the like. A control unit or circuit 13a receives the external trigger signals 16a-16d inputted at the external trigger input terminals 17a-17d and outputs the selection signal 14 and the A/D conversion start signal 15 to the selector 3 and the A/D converter 5, respectively.

In operation, the selector 3, the A/D converter 5, the registers 9a-9d, and the CPU 12 operate in the same way as those of FIG. 17 and, therefore, their description will be omitted.

Upon reception of the external trigger signals 16a-16d via the external trigger input terminals 17a-17d, the control circuit 13a outputs to the selector 3 the selection information 14 for selecting the analog signal input terminal 2a-2d corresponding to the external trigger input terminal 17a-17d which has received the external trigger signal and to the A/D converter 5 the conversion start signal 15 for starting A/D conversion of the selected signal 4. Then, upon reception of the conversion finish signal 19 from the A/D converter 5, it outputs the latch signal 11a-11d for holding the digital signal 8 in the register 9a-9d which corresponds to the selection signal 14 or the external trigger input terminal 17a-17d which has received the external trigger signal.

Figure 2:
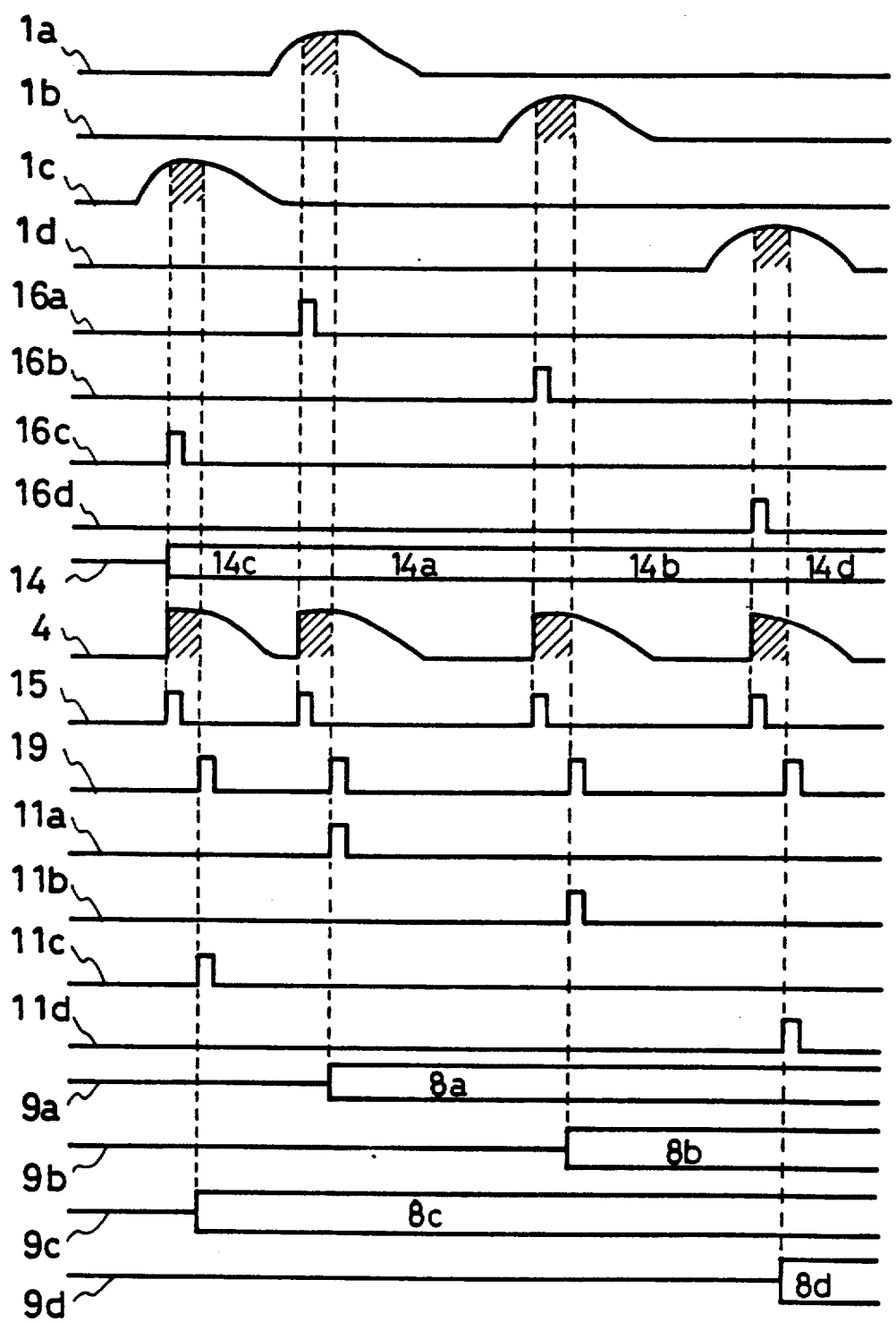
FIG. 2 is a timing diagram showing the operation of the microcomputer of FIG. 1.
Figure 18:
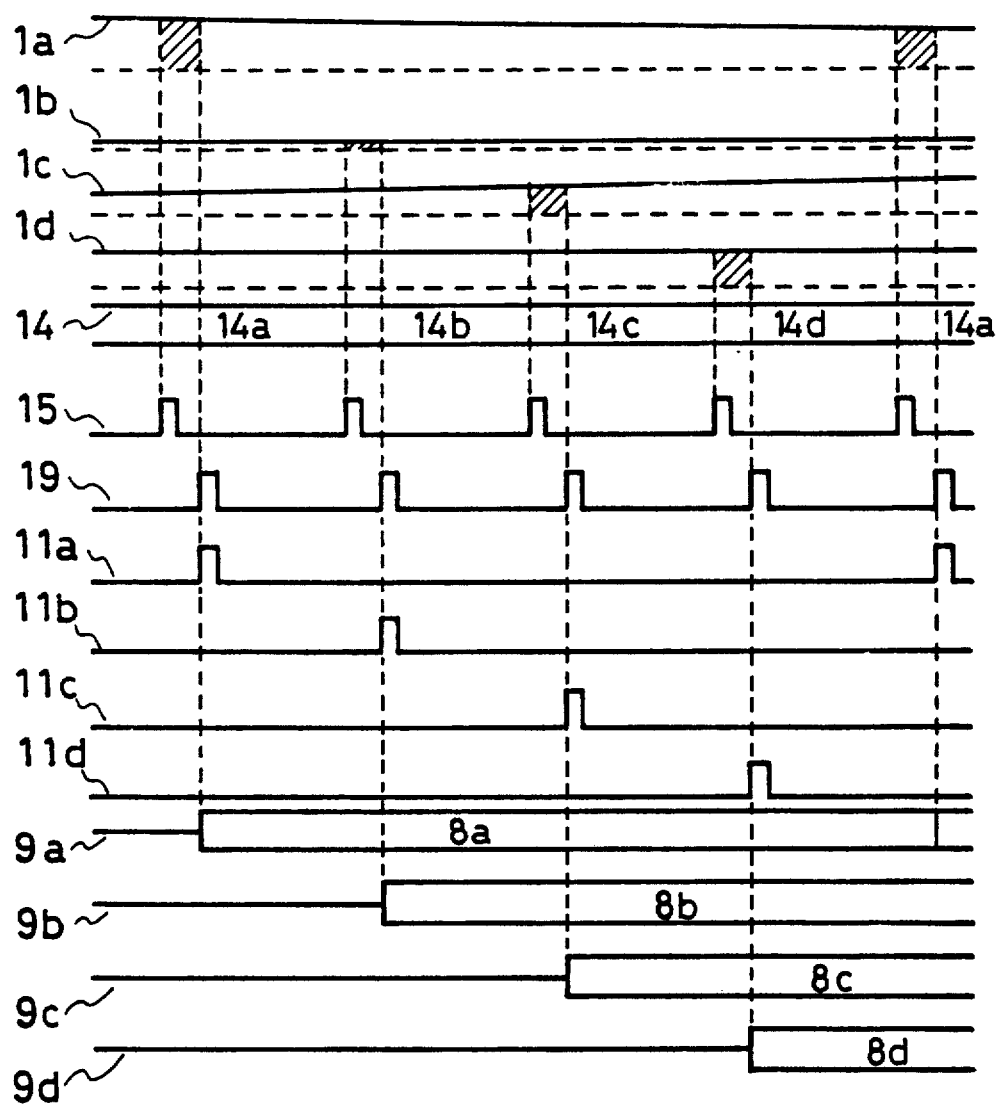
FIGS. 18 and 19 are timing diagrams showing the operation of the conventional microcomputer.
Figure 19:
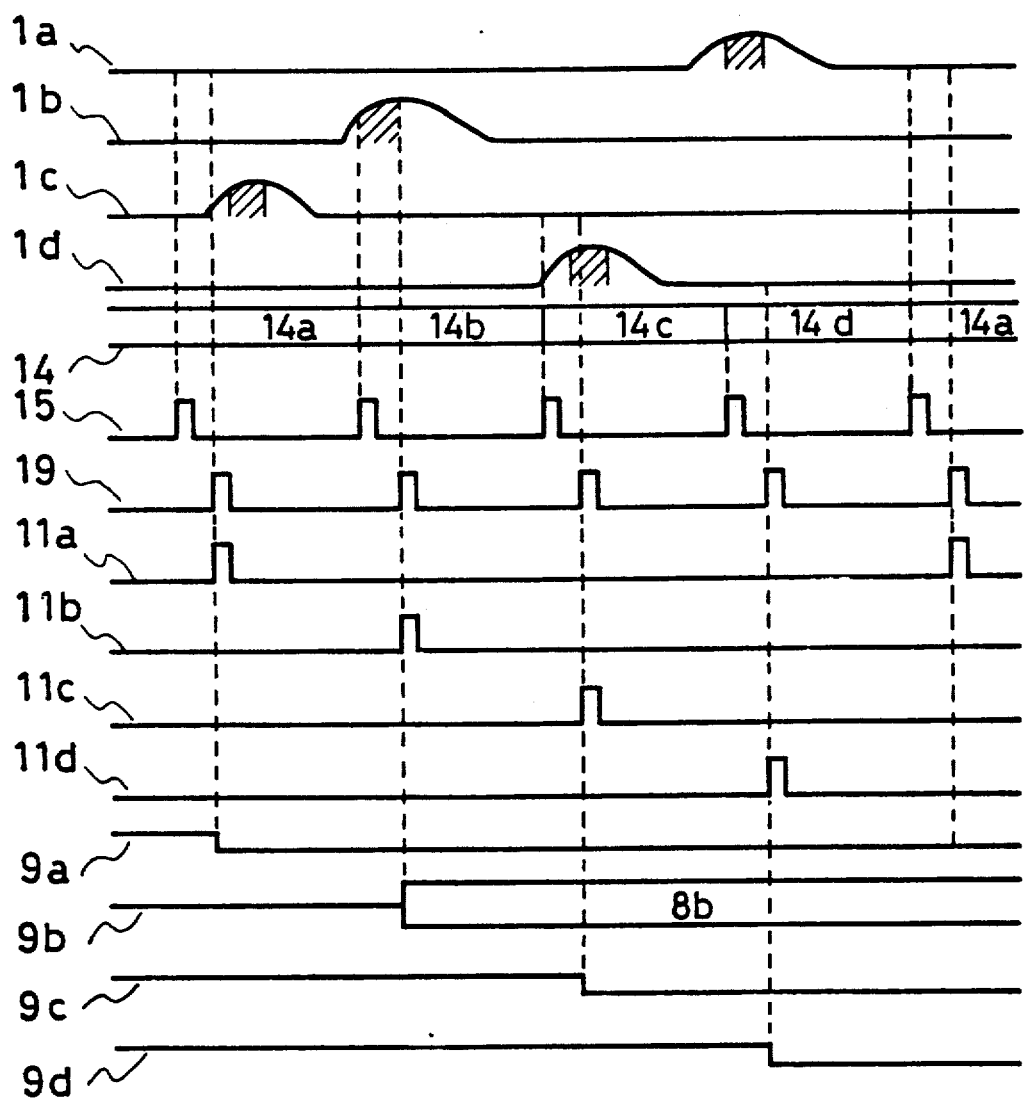

In FIG. 2, like reference numerals denote like or corresponding parts of FIGS. 1 and 18. When four analog signals 1a-1d are to be converted into digital signals with the timing indicated by the hatching, the external trigger signals 16a-16d, which have been generated by the external circuit by means of a differentiation circuit or the like, are applied to the corresponding external trigger input terminals 17a-17d.

Figure 3:
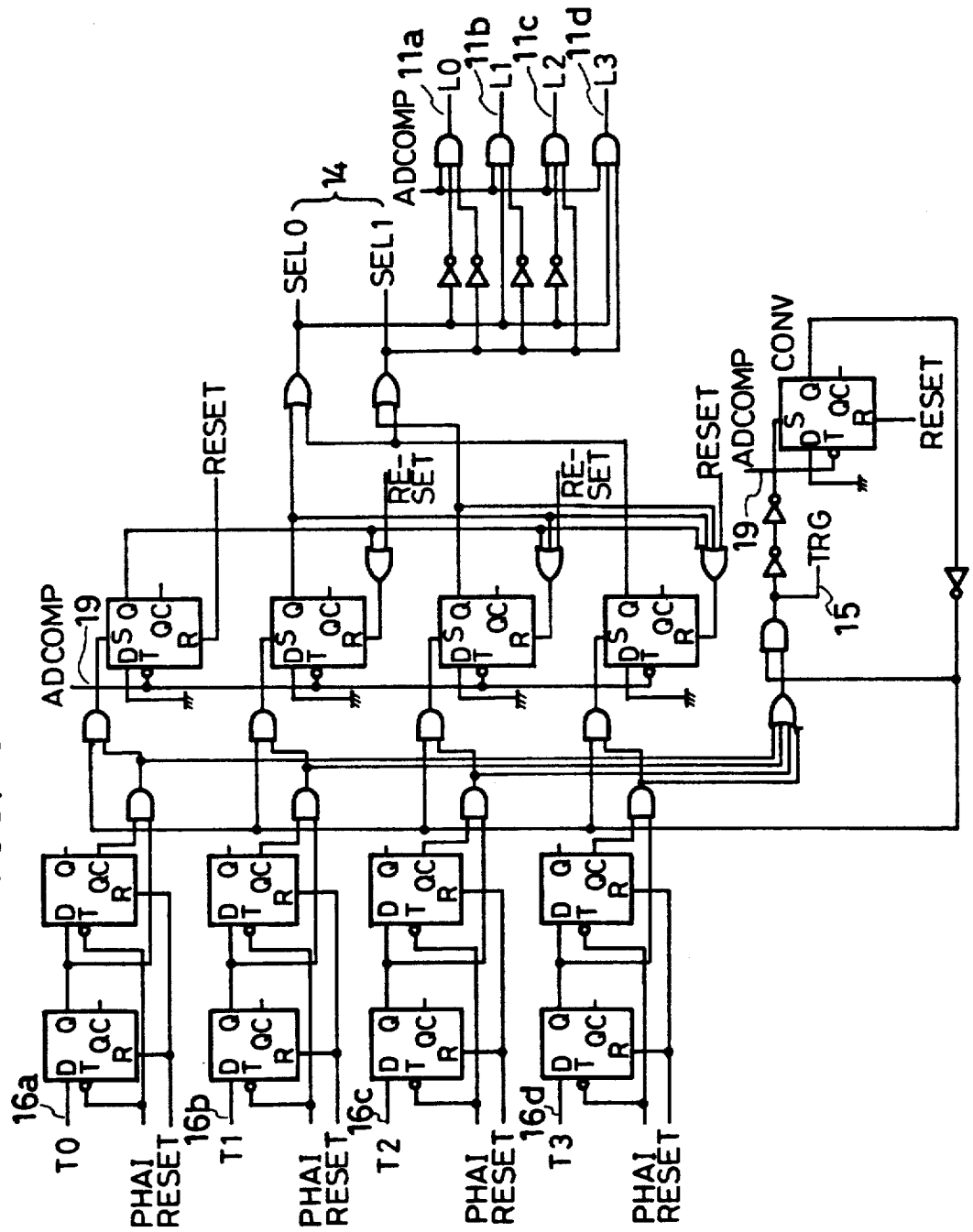
FIG. 3 is a logic circuit diagram of a control circuit useful for the microcomputer of FIG. 1.
Figure 4:
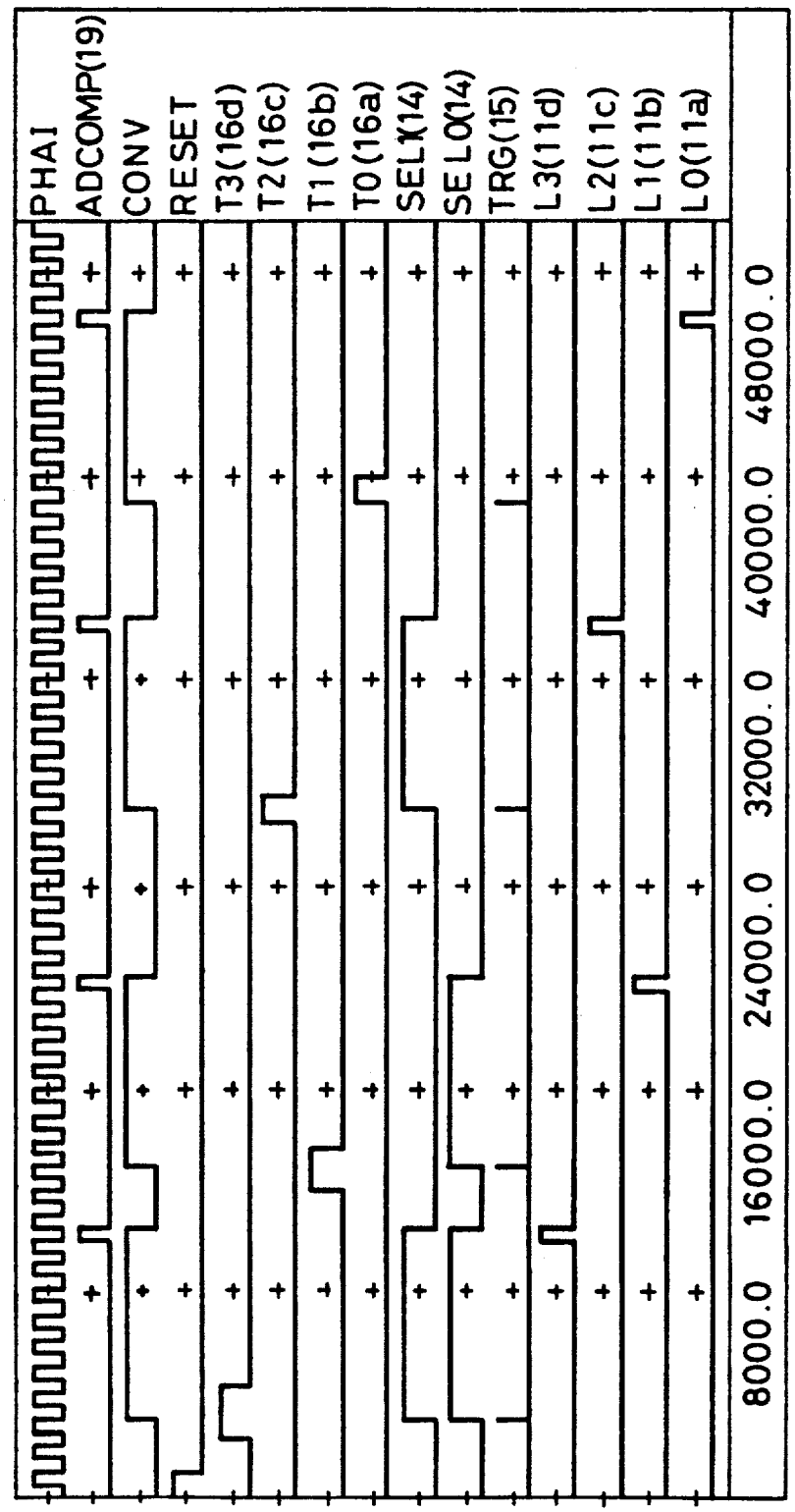
FIG. 4 is a timing diagram showing the operation of the control circuit of FIG. 3.

FIGS. 3 and 4 show a logic circuit for the control circuit 13a and the timing with which the logic circuit operates, wherein T0-T3 are external trigger signals, each having a reference character of FIG. 1 to show its correspondence thereto, and PHAI and RESET are system clock and reset signals, respectively, which are omitted in FIG. 1 for simplicity. In FIG. 3, the external trigger signals are prioritized as T0(16a)>T1(16b)>T2(16c)>T3(16d) and ignored if they are inputted during A/D conversion.

As has been described above, the microcomputer according to this embodiment is provided with the input unit made from the four external trigger input terminals 17a-17d for designating selection and timing information and the control circuit 13a made to receive a trigger signal at one of the external trigger input terminals 17a-17d and output to the selector 3 the selection information 14 for selecting the analog signal input terminal which corresponds to the external trigger input terminal, to the A/D converter 5 the conversion start signal 15, and, upon reception of the conversion finish signal 19 from the A/D converter 5, to the register corresponding to the external trigger input terminal the latch signal 11a-11d for latching the digital signal 8 from the A/D converter 5 so that even if a number of analog signals which vary with the time to relatively large extent are applied to the analog signal input terminals 2a-2d, it is possible to perform A/D conversion of any one of the analog signals with given timing by providing an external circuit capable of applying a trigger signal to a given external input terminal 17a-17d with the given timing.

Figure 5:
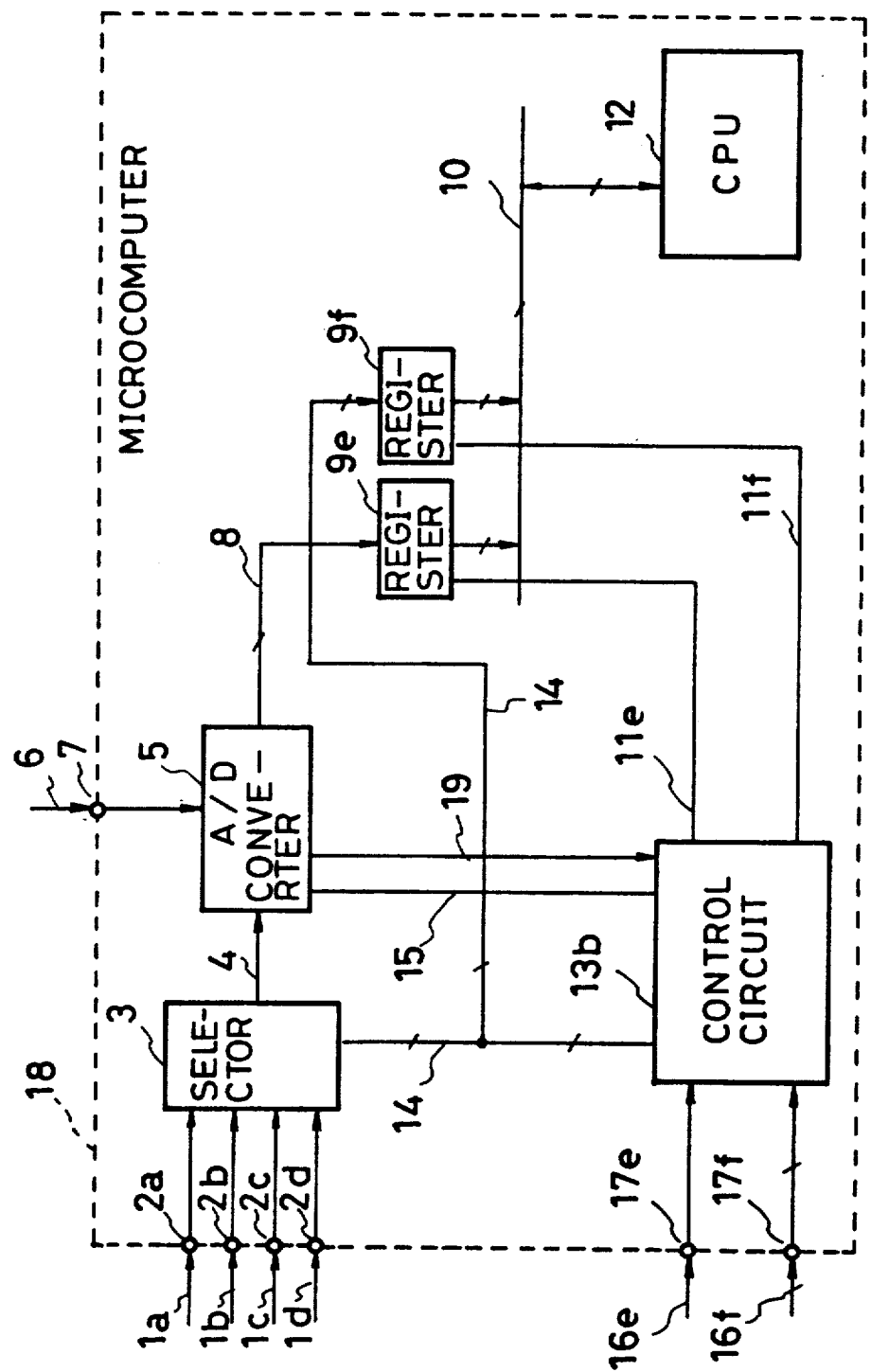
FIG. 5 is a block diagram of a microcomputer according to another embodiment of the invention.

FIG. 5 shows a microcomputer according to another embodiment of the invention, wherein like reference characters denote like or corresponding parts of FIG. 1, and their description will be omitted.

The microcomputer 18 includes a digital signal register 9e for receiving the digital signal 8 from the A/D converter 5; a 2-bit, selection information register 9f for receiving the selection information 14 from a control circuit 13b, the digital signal register 9e and the selection information register 9f constituting a storage unit; an external trigger input terminal 17e and a 2-bit, external selection information input terminal 17f for receiving an external trigger signal 16e and an external selection information or 2-bit, coded digital signal 16f, respectively; a control unit or circuit 13b for outputting the selection information 14 to the selector 3 and the conversion start signal 15 to the A/D converter 5 in response to the external trigger signal 16e and the external selection information 16f which are inputted at the external trigger input terminal 17e and the external selection information terminal 17f, respectively.

In operation, the selector 3 and the A/D converter 5 operate in the same way as those of FIG. 17 and, therefore, their description will be omitted.

The control circuit 13b receives the external selection information 16f via the external selection information terminal 17f and outputs the selection information 14 to both the selector 3 and the selection information register 9f for selecting one of the analog signal input terminals 2a-2d corresponding to the external selection information 16f. Upon reception of the external trigger signal 16e via the external trigger input terminal 17e, it outputs the latch signal 11f to the selection information register 9f for holding the selection signal 14 and the conversion start signal 15 to the A/D converter 5. Then, upon reception of the conversion finish signal 19 from the A/D converter 5, it outputs the latch signal 11e to the digital signal register 9e for holding the digital signal 8. Then, the CPU 12 reads the digital signal register 9e and the selection information register 9f and finds out which of the analog signal input terminals 2a-2d corresponds to the digital signal 8.

Figure 6:
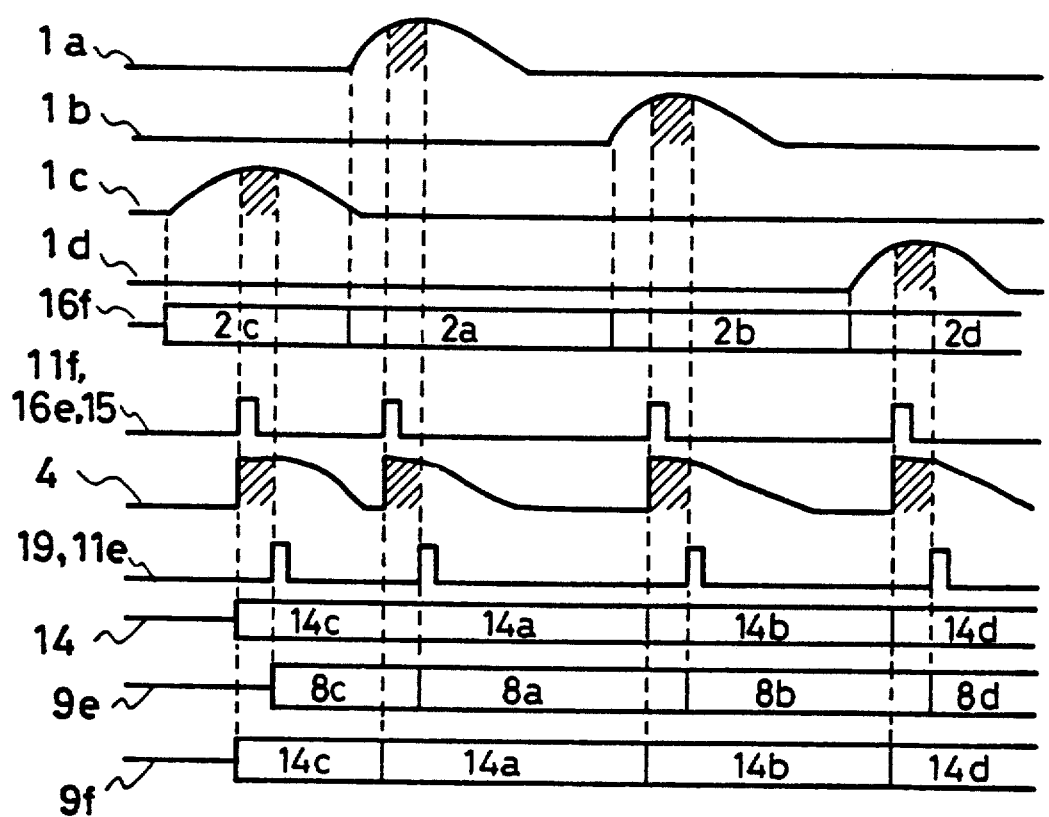
FIG. 6 is a timing diagram showing the operation of the microcomputer of FIG. 5.

FIG. 6 shows the timing with which the microcomputer of FIG. 5 operates. Like reference characters denote like or corresponding parts of FIG. 5. When four analog input signals 1a-1d are to be converted into digital signals with the timing indicated by the hatching, the external trigger signal 16e is applied to the external trigger input terminal 17e with the above timing, with the external selection information 16f having been applied to the external selection information input terminal 17f corresponding to one of the analog signal input terminals 2a-2d to be selected.

Figure 7:
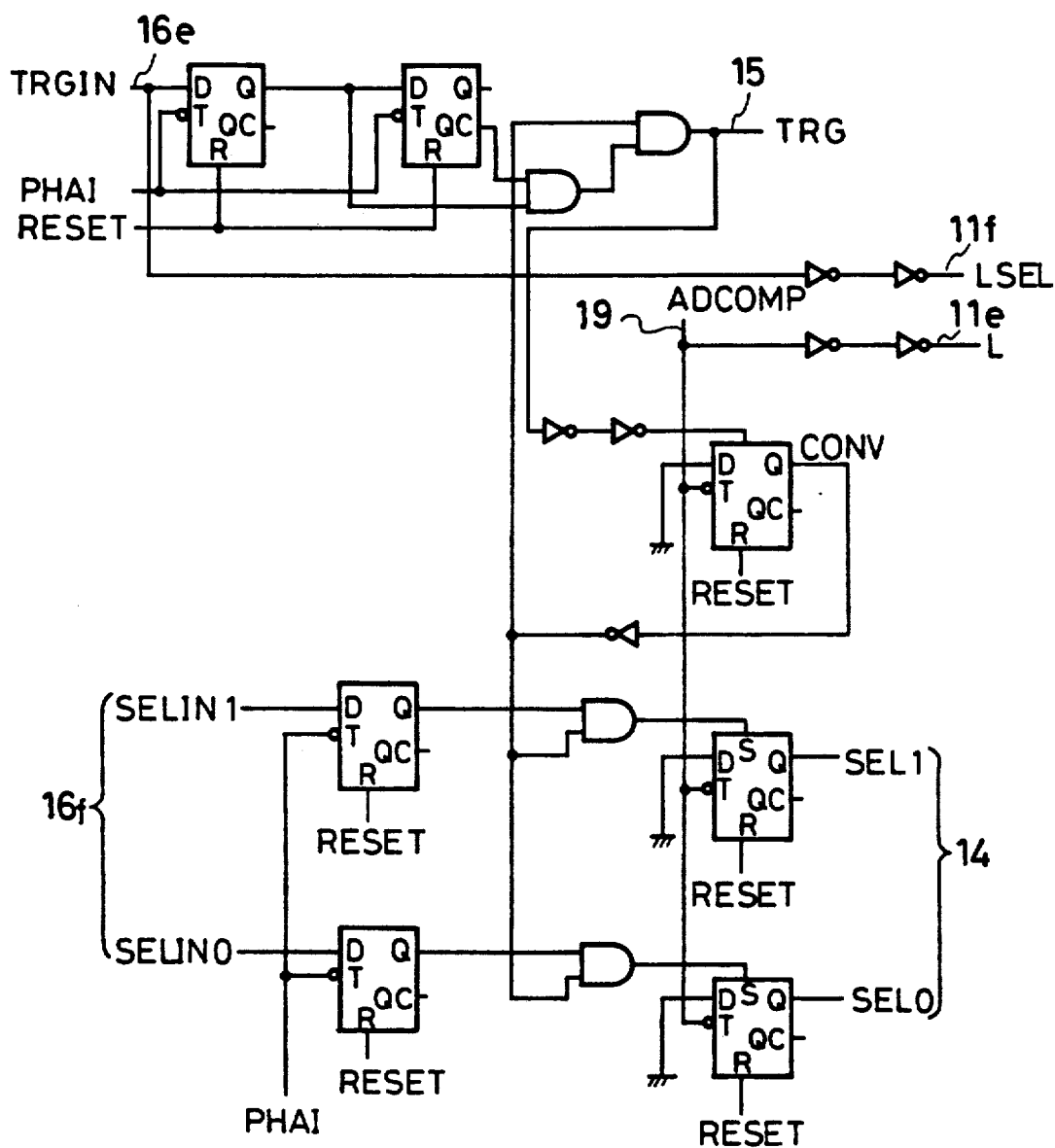
FIG. 7 is a logic circuit diagram of a control circuit useful for the microcomputer of FIG. 5.
Figure 8:
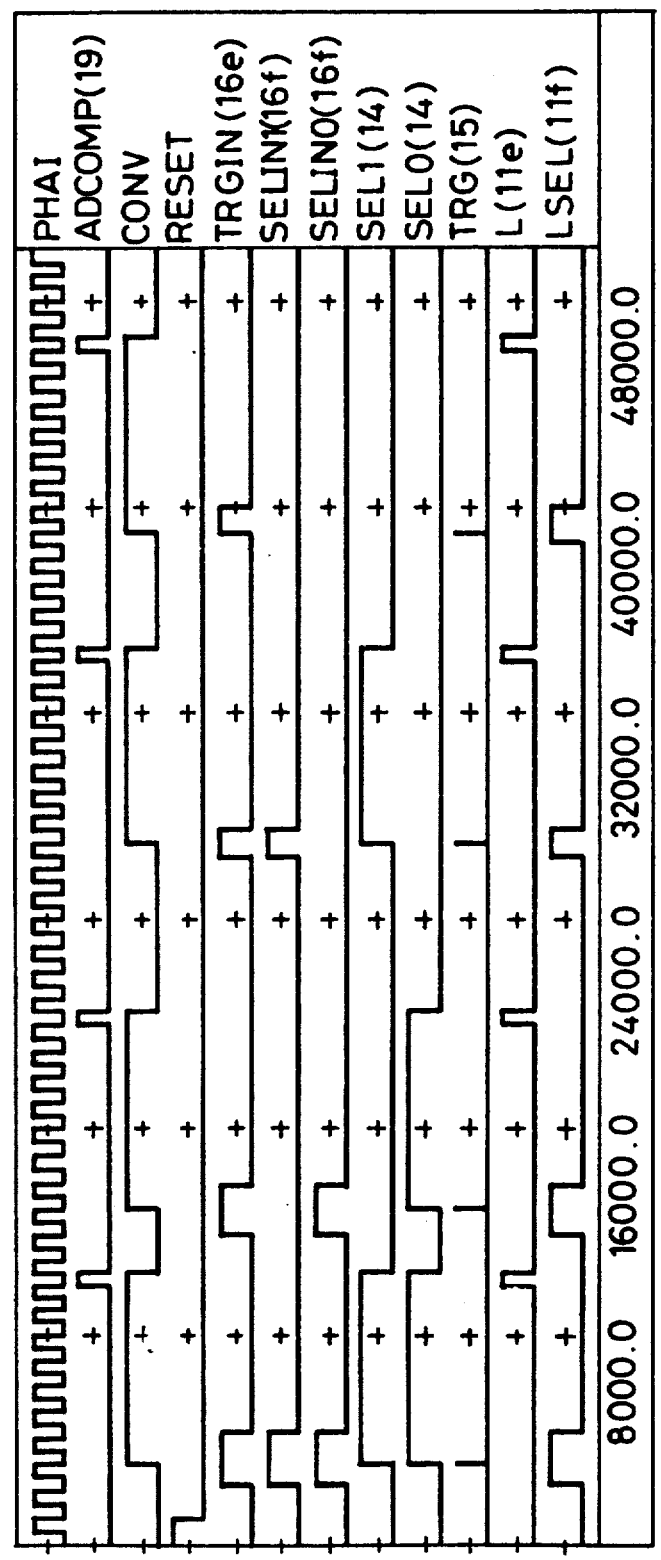
FIG. 8 is a timing diagram showing the operation of the control circuit of FIG. 7.

FIGS. 7 and 8 show a logic circuit useful for the control circuit 13b and the timing with which the logic circuit operates, respectively, wherein TRGIN has the reference characters corresponding to those of FIG. 5 to show its correspondence thereto, and PHAI and PRESET are the system clock and reset signals omitted in FIG. 5. External triggers inputted during A/D conversion are ignored.

As has been described above, the microcomputer according to this second embodiment is provided with the input unit which is made from the external trigger input terminal 17e and the external selection information input terminal 17f and the control circuit 13b which receives the coded digital signal or external selection information 16f via the external selection information input terminal 17f and outputs the selection information 14 to both the selector 3 and the selection information register 9f for selecting the analog signal input terminal corresponding to the coded digital signal, and receives the external trigger signal 16e via the external trigger input terminal 17e and outputs the latch signal 11f to the selection information register 9f for holding the selection information 14 and the conversion start signal 15 to the A/D converter 5, and, upon reception of the conversion finish signal 19, the latch signal 11e to the digital signal register 9e for holding the digital signal 8 so that by applying a trigger to the external trigger input terminal 17e with given timing, with the coded digital signal or external selection information 16f applied to the external selection information terminal 17f, it is possible to not only produce the same results as those of the first embodiment but also reduce the number of input terminals. Since the storage unit is made from the digital signal register 9e and the selection information register 9f, the number of registers necessary for A/D conversion is constant regardless of the number of analog signal input terminals, resulting in the reduced semiconductor integrated circuit area in which the A/D converter is fabricated.

Figure 9:
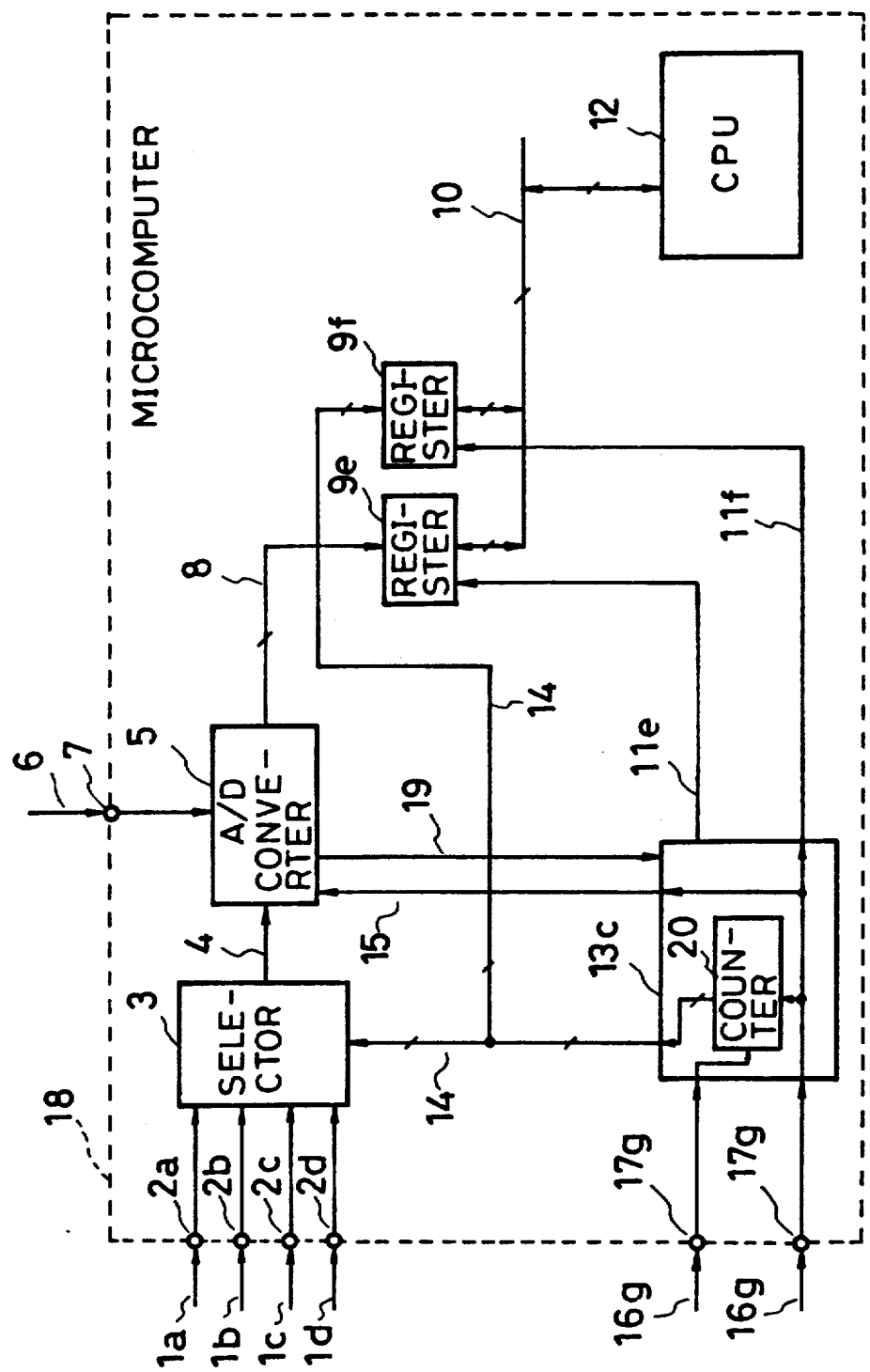
FIG. 9 is a block diagram of a microcomputer according to still another embodiment of the invention.

FIG. 9 shows a microcomputer according to still another embodiment of the invention, wherein like reference characters denote like or corresponding parts of FIG. 5, and their description will be omitted.

The microcomputer 18 has counter set and external trigger input terminals 17g and 17h for receiving counter set and external trigger signals 16g and 16h, respectively, and a control unit or circuit 13c for outputting the selection information 14 and the conversion start signal 15 to the selector 3 and the A/D converter 5, respectively, in response to the counter set signal 16g and the external trigger signal 16h via the above input terminals. The control circuit 13c has a counter 20 for outputting the selection information 14 in response to the counter set signal 16g and the external trigger signal 16h.

In operation, the selector 3, the A/D converter 5, the digital signal register 9e, the selection information register 9f, and the CPU 12 operate in the same way as those of FIG. 5 and, therefore, their description will be omitted.

Upon reception of the count set signal 16g via the count set input terminal 17g, the counter 20 initializes its output or selection information 14 so that in response to the counter set signal 16g and the external trigger signal 16h, the control circuit 13c switches the selection information 14 with a certain period and a certain order and outputs it to the selector 3 and the selection information register 9f. Upon reception of the external trigger signal 16h, it outputs the conversion start signal 15 to the A/D converter 5 and the latch signal 11f to the selection information register 9f for holding the selection information 14, and, upon reception of the conversion finish signal 19, the latch signal 11e to the digital signal register 9e for holding the digital signal 8.

Figure 10:
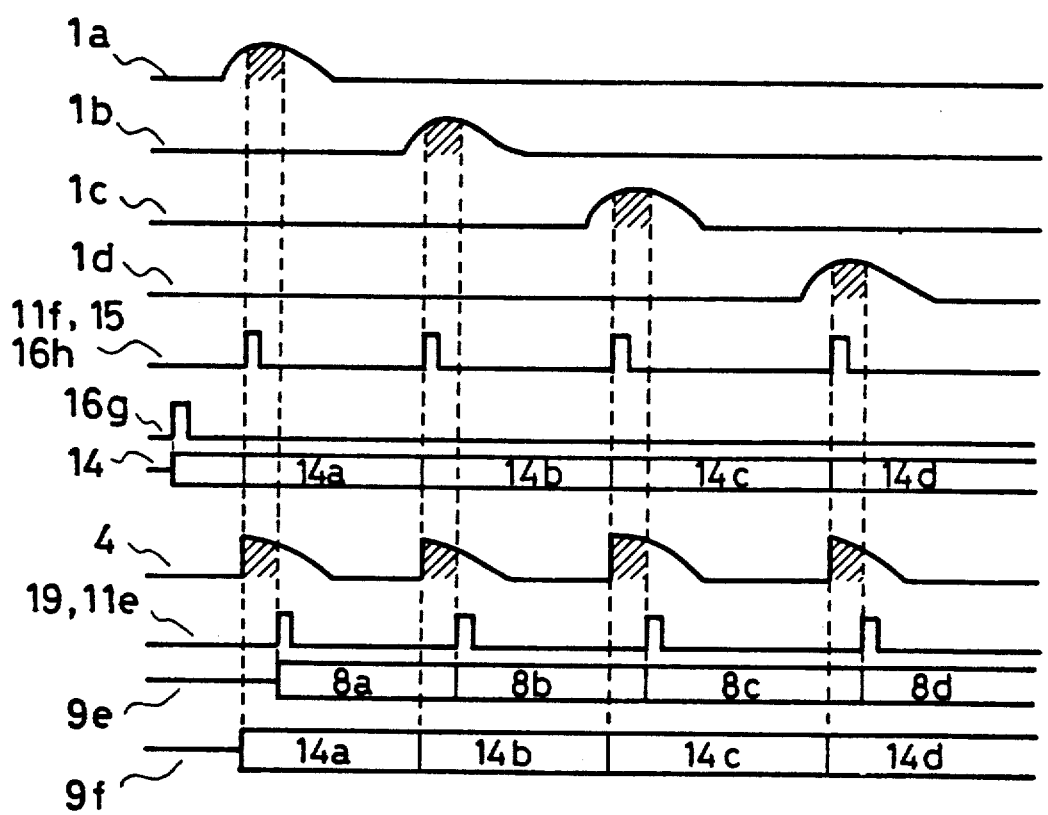
FIG. 10 is a timing diagram showing the operation of the microcomputer of FIG. 9.

FIG. 10 shows the timing with which the microcomputer of FIG. 9 operates, wherein like reference characters denote like or corresponding parts of FIG. 9. When four analog input signals 1a-1d are to be converted into digital signals with the timing indicated by the hatching, the external trigger signal 16h is applied to the external trigger input terminal 17h with the above timing, with the counter set signal 16g having been applied to the counter set input terminal 17g.

Figure 11:
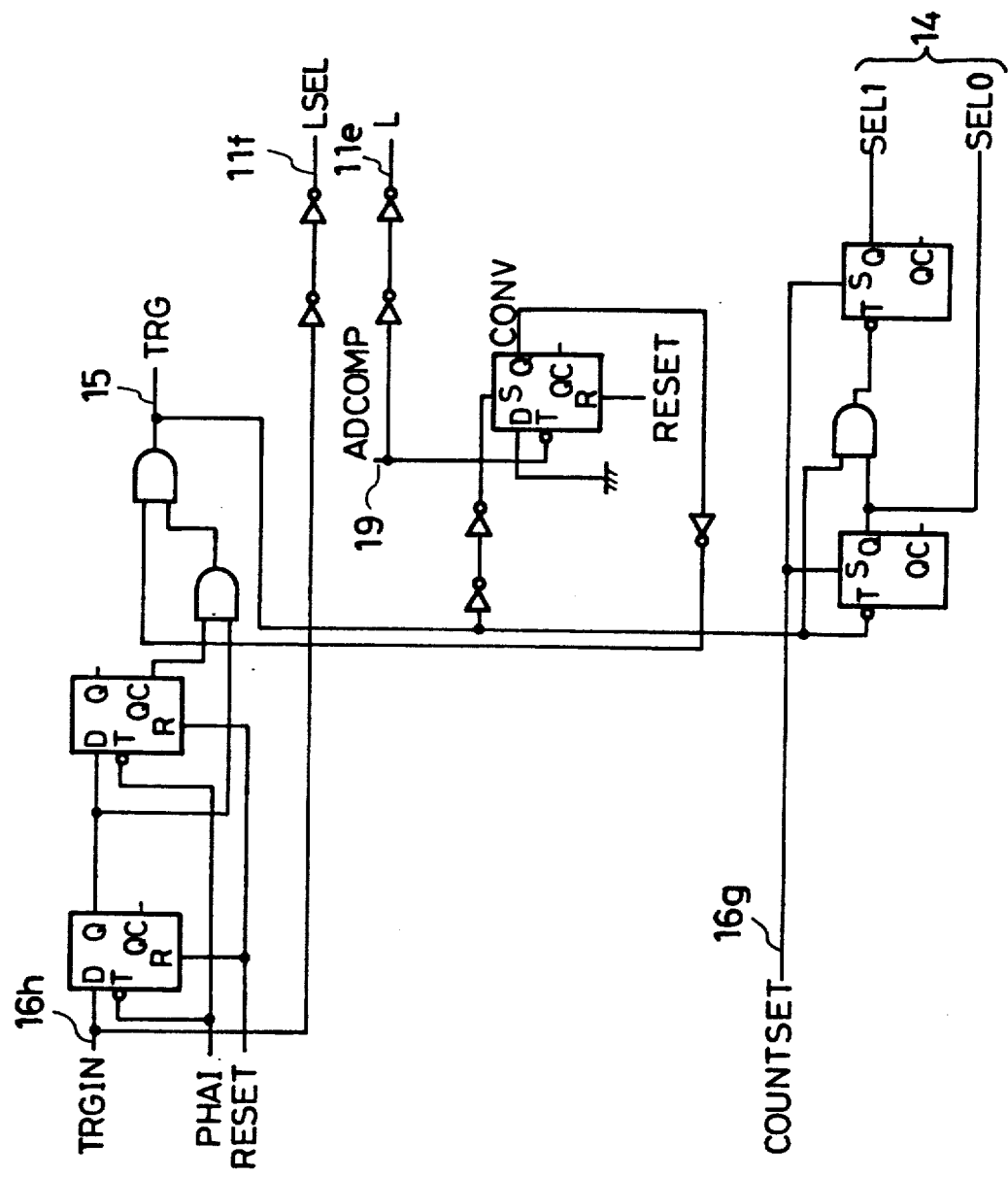
FIG. 11 is a logic circuit diagram of a control circuit useful for the microcomputer of FIG. 9.
Figure 12:
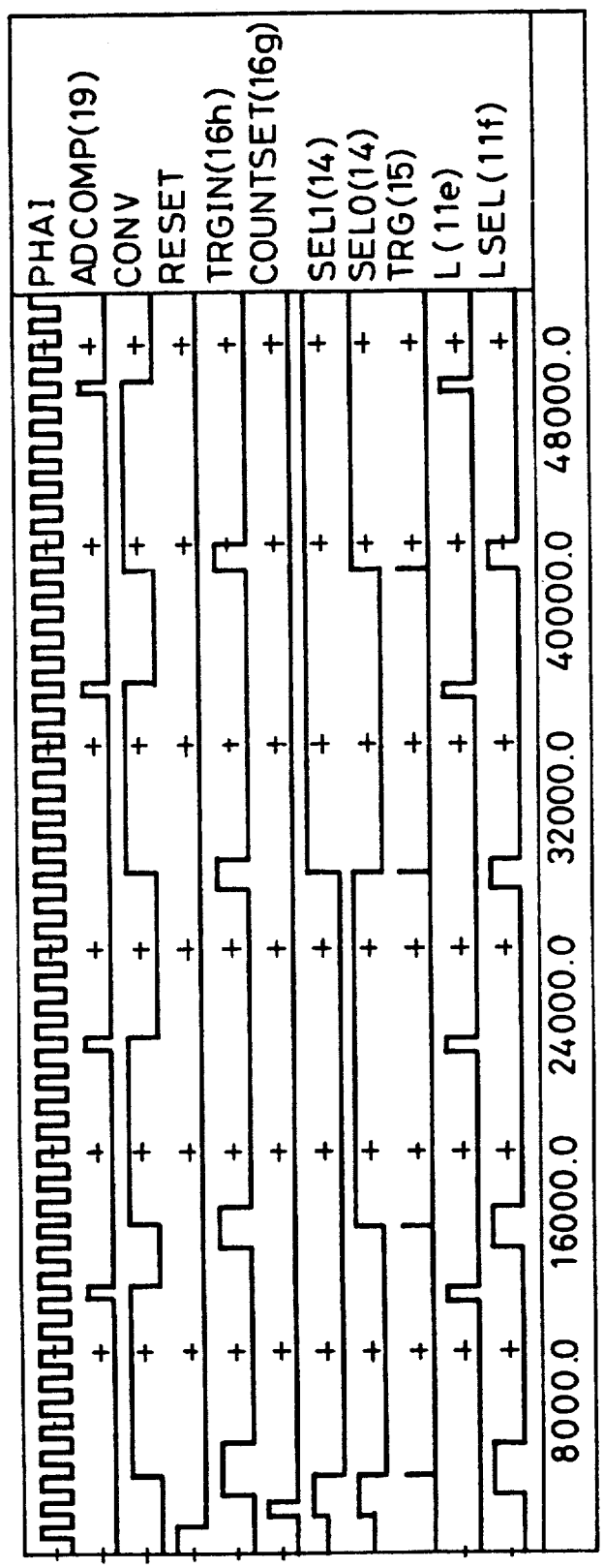
FIG. 12 is a timing diagram showing the operation of the control circuit of FIG. 11.

FIGS. 11 and 12 show a logic circuit useful for the control circuit 13c and the timing with which the logic circuit operates, respectively. TRGIN is provided with the reference characters corresponding to those of FIG. 9 to show its correspondence thereto, and PHAI and RESET are the system clock and reset signals which are omitted in FIG. 9 for simplicity. External triggers applied during A/D conversion are ignored.

As has been described above, the microcomputer according to this third embodiment is provided with the input unit made from the counter set input terminal 17g and the external trigger input terminal 17h and the control circuit 13c having the counter 20 which receives the counter set signal 16g for initialization of selection of the analog signal input terminals 2a-2d and outputs, upon reception of the external trigger signal 16h, the selection information 14 to the selector 3 so that the selection is switched at a certain period and a certain order, and the control circuit for outputting, upon reception of the external trigger signal 16h, the conversion start signal 15 to the A/D converter 5 and the latch signal 11f to the selection information register 9f for holding the selection information 14 and, upon reception of the conversion finish signal 19 from the A/D converter 5, the latch signal 11e to the digital signal register 9e for holding the digital signal 8, so that by providing an external circuit which is able to apply the counter signal 16g to the counter set input terminal 17g and the trigger signal to the external trigger input terminal 17h with given timing, it is possible to select one of the analog signals with given timing according to the sequence of the counter 20 for performing A/D conversion. In addition, it is possible to reduce the numbers of input terminals and registers, respectively. The number of input terminals is less than that of the second embodiment. That is, only the counter set input terminal 17g and the external trigger input terminal 17h are necessary regardless of the number of analog signal input terminals.

Figure 13:
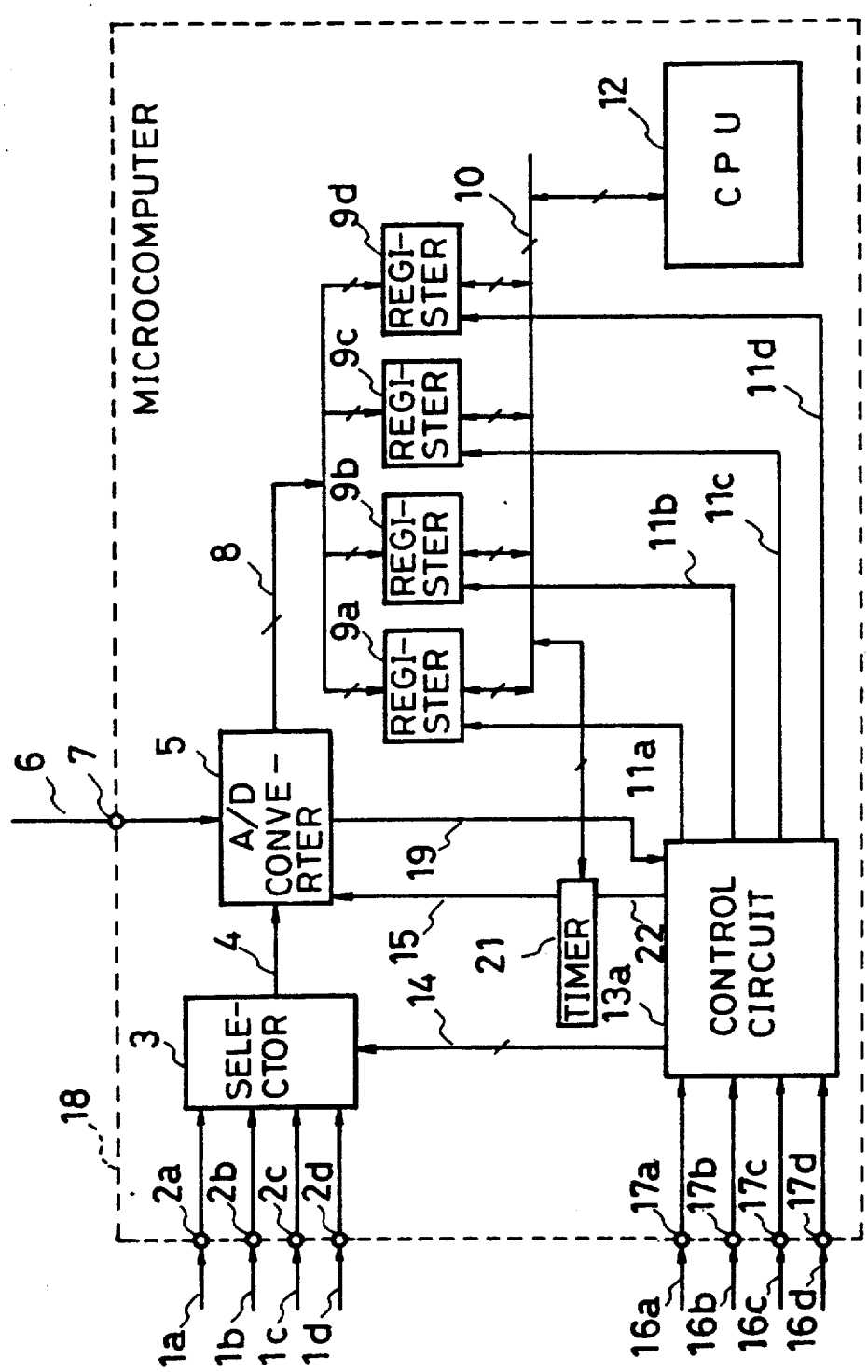
FIG. 13 is a block diagram of a microcomputer according to yet another embodiment of the invention.

FIG. 13 shows a microcomputer according to yet another embodiment of the invention, wherein like reference characters denote like or corresponding parts of FIG. 1, and their description will be omitted.

In response to a trigger signal 22 outputted by the control circuit 13a, a timer 21 outputs to the A/D converter 5 the conversion start signal 15 with a delay set by the CPU 12.

In operation, the selector 3, the A/D converter 5, the digital signal registers 9a-9d, and the CPU 12 operate in the same way as those of FIG. 1, and, therefore, their description will be omitted.

Upon reception of the external trigger signals 16a-16d via the external trigger input terminals 17a-17d, the control circuit 13a outputs the selection information 14 to the selector 3 for selecting the analog signal input terminals 2a-2d corresponding to the external trigger input terminals 17a-17d and the trigger signal 22 to the timer 21. Upon reception of the conversion finish signal 19 from the A/D converter 5, it outputs the latch signals 11a-11d to the digital signal registers 9a-9d for holding the digital signals 8 from the A/D converter 5 in the digital signal registers 9a-9d corresponding to the external trigger input terminals 17a-17d or selection information 14. The CPU 12 sends, in advance, the latch signal and the delay setting data to the timer 21 via the internal bus 10. Upon reception of the latch signal, the timer 21 holds the delay setting data and outputs, upon reception of the trigger signal 22 from the control circuit 13a, the conversion start signal 15 to the A/D converter 5 with the delay which is proportional to the delay setting data.

Figure 14:
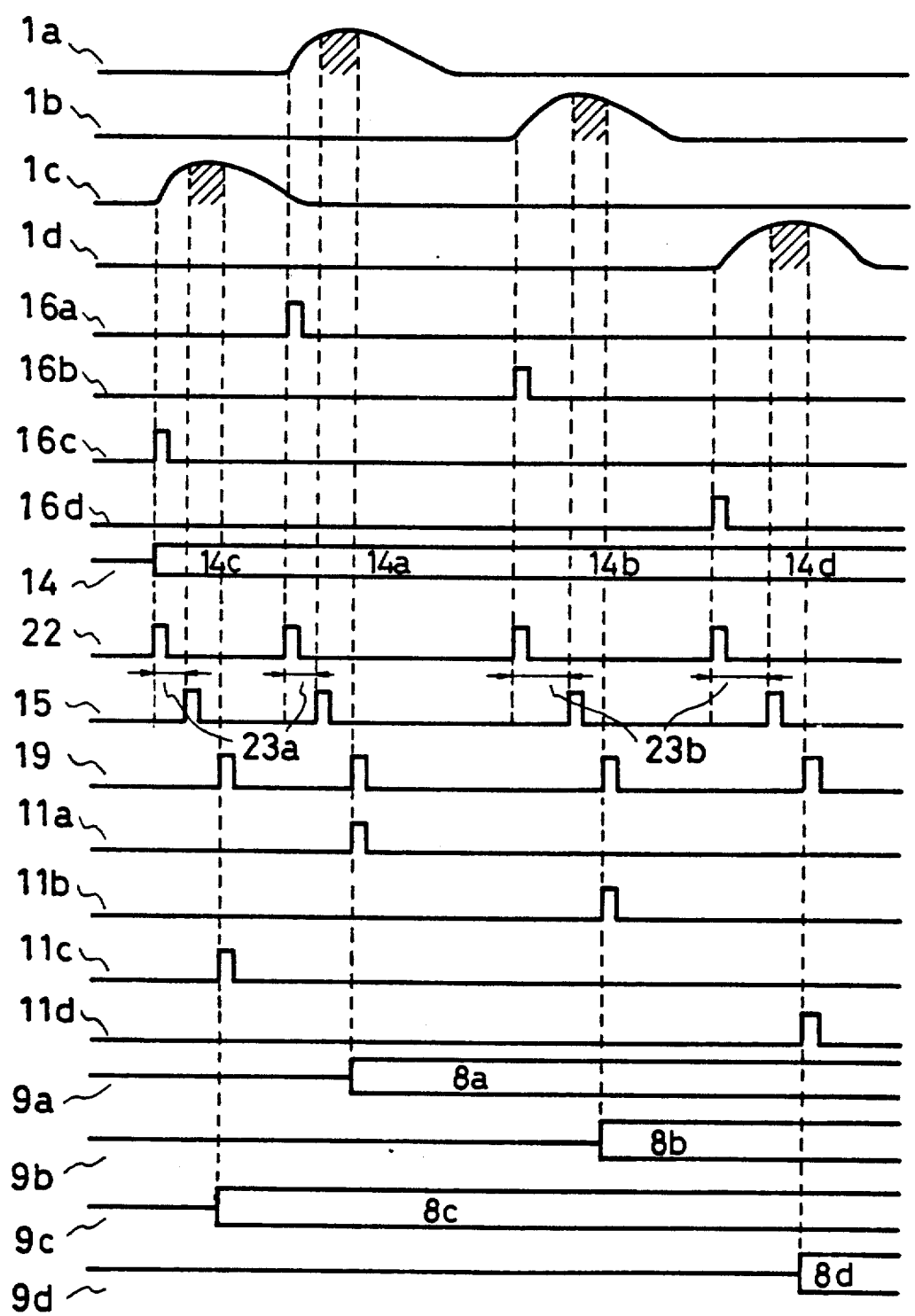
FIG. 14 is a timing diagram showing the operation of the microcomputer of FIG. 13.

FIG. 14 show the timing with which the microcomputer of FIG. 13 operates. In FIG. 14, like reference characters denote like or corresponding parts of FIG. 13, and 23a and 23b are the delays which are proportional to the delay setting data set in the timer 21. When four analog input signals 1a-1d are to be converted into digital signals with the timing indicated by the hatching, the CPU 12 set, in advance, in the timer 21 the delay setting data in proportion to the delay—a period between the external trigger signals 16a-16b and the above timing for A/D conversion—with which the timer 21 outputs the conversion start signal 15 after reception of the trigger signal 22 from the control circuit 13a and then the external trigger signal 16a-16d generated by the external circuit are applied to the corresponding external trigger input terminals 17a-17d.

Figure 15A:
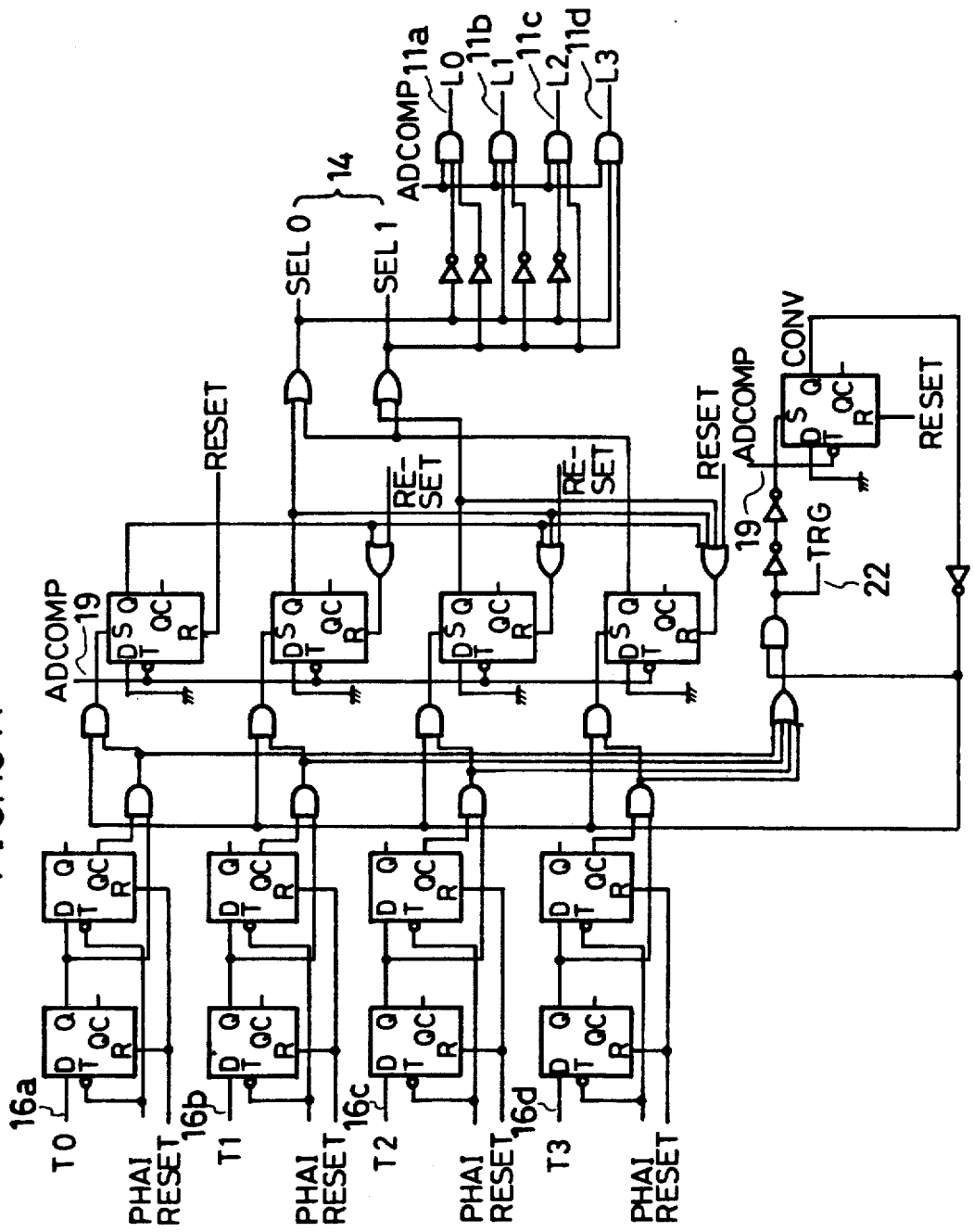
FIG. 15a and 15b are logic circuit diagrams of a control circuit useful for the microcomputer of FIG. 13.
Figure 15:
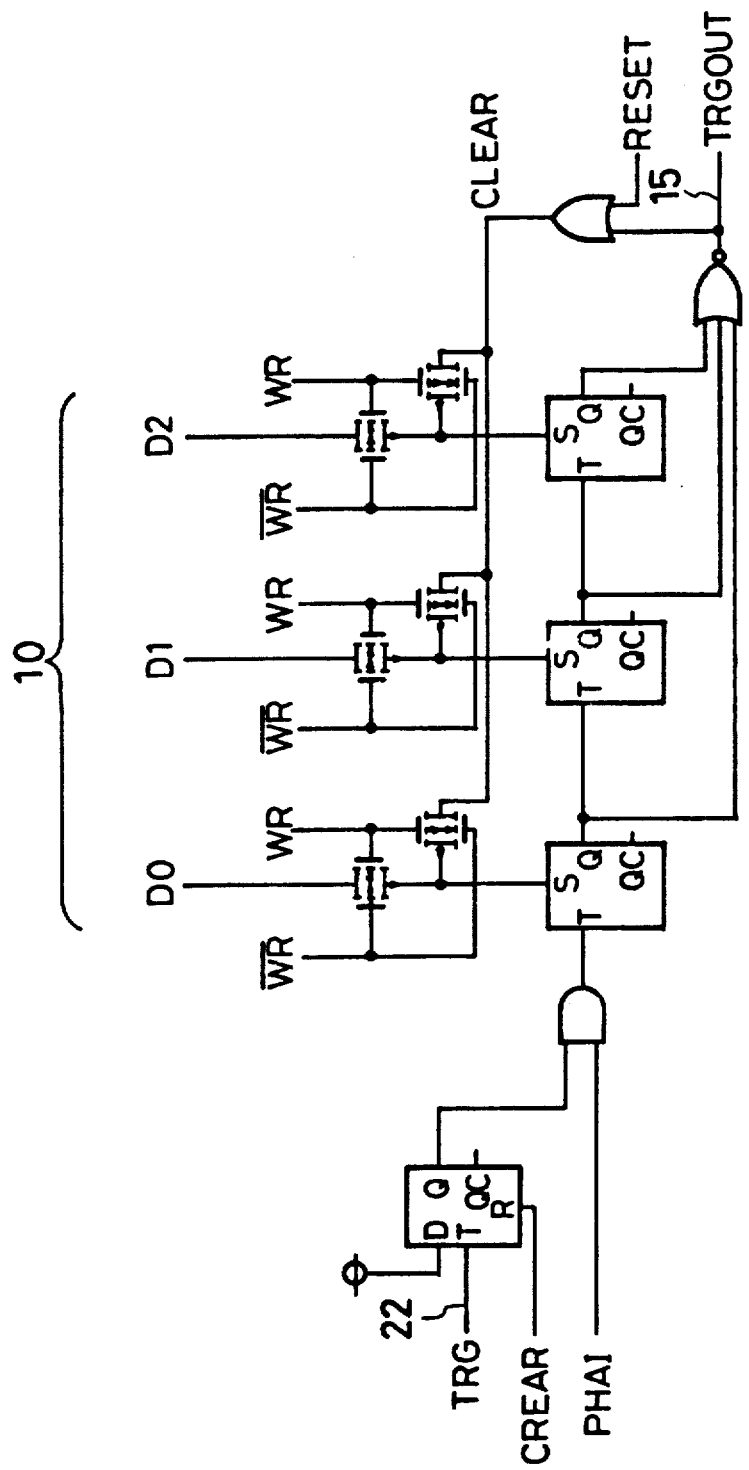
Figure 16:
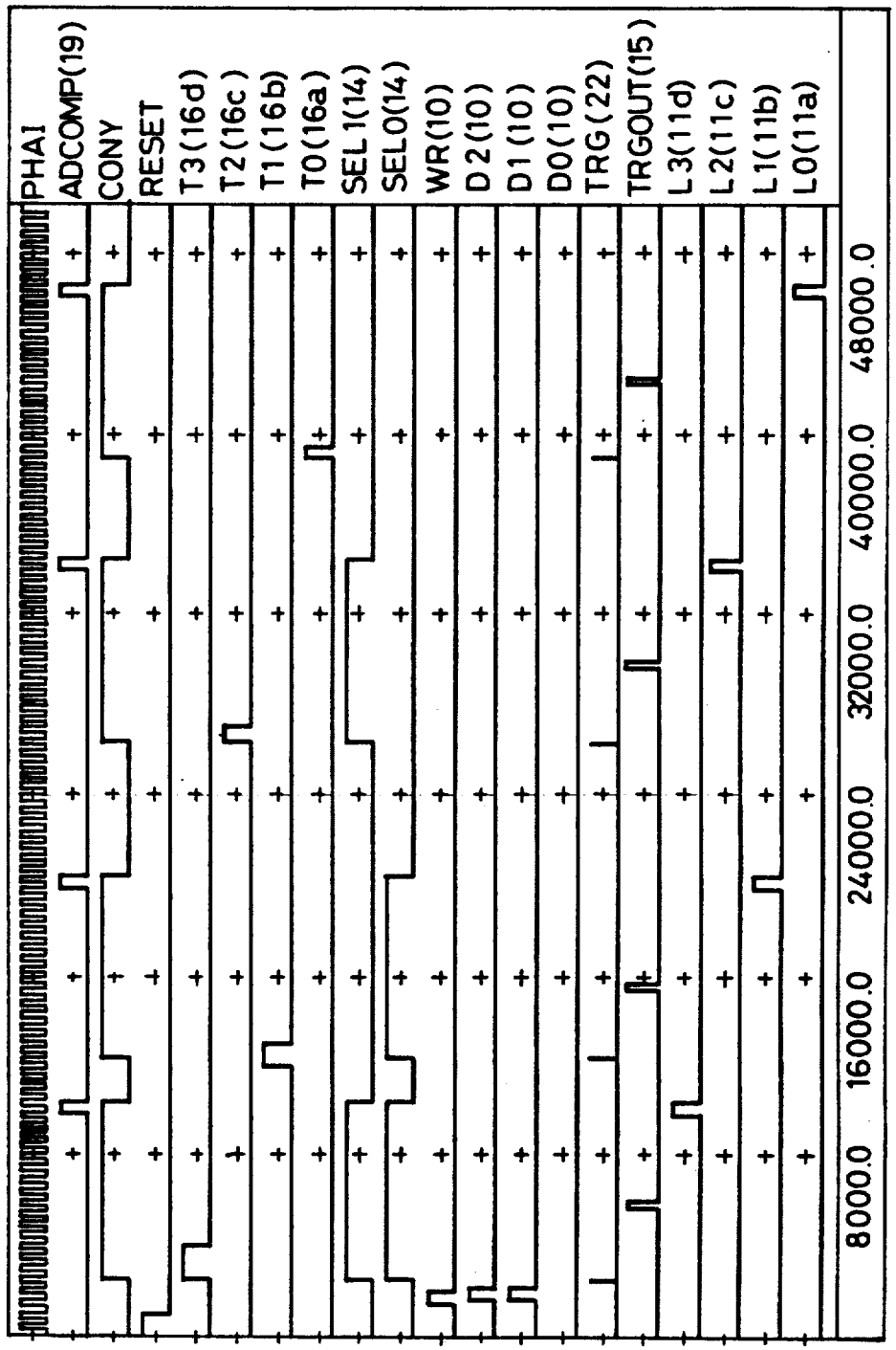
FIG. 16 is a timing diagram showing the operation of the control circuit of FIG. 15.

FIGS. 15A and 15B, and 16 show logic circuits useful for the control circuit 13a and the timer 21, respectively, and the timing with which they operate. T0-T3 and TRG are provided with the reference characters corresponding to those of FIG. 13 to show their correspondence thereto, and PHAI and RESET are the system clock and reset signals which are omitted in FIG. 13 for simplicity. In FIG. 15, the external trigger signals are prioritized as T0(16a)>T1(16b)>T2(16c)>T3(16d). External triggers applied during A/D conversion are ignored.

As has been described above, the microcomputer according to this fourth embodiment is provided with the timer 21 in which given delay information is set by the CPU 12 with respect to the timing information or external trigger signals 16a-16b for starting A/D conversion, so that it is possible to not only produce the same results of those of the first embodiment but also perform A/D conversion with the delay which is proportional to the delay information set in the timer 21 by the CPU 12 with respect to the external timing information or trigger signals 16a-16b. That is, even if the external circuit is relatively simple, it is possible to set delay setting data in the timer 21 with higher degrees of freedom than those of the above embodiments for performing A/D conversion.

Alternatively, the timer 21, which is added to the first embodiment to form the fourth embodiment, may also be added to the second and third embodiments to produce the same results as those of the fourth embodiment. The control based on the internal timing information and selection information as the conventional microcomputer may be added to the control based on the external timing and selection information as described above such that these controls are switched depending upon the presence or absence of the external inputs. The storage unit in the first and fourth embodiments may be made from the digital signal register 9e and the selection information register 9f as in the second and third embodiments.

As has been described above, the microcomputer according to the invention is provided with an input unit for receiving selection information to select one of a plurality of analog signal input terminals and timing information to start A/D conversion for the selected analog signal input terminal and a control unit for outputting selection information to the selection unit and a conversion start signal to the A/D converter in response to the selection information and the timing information, so that it is possible to perform A/D conversion for a plurality of analog signals each vary with the time to a relatively large extent.

We claim:

1. A microcomputer receiving a plurality of analog signals to be converted to digital signals, the microcomputer having a central processing unit for accessing the digital signals, the microcomputer comprising:

a plurality of analog signal input terminals at which the respective analog signals are received;

selection means for selecting one of the received analog signals in response to a selection signal to achieve a selected analog signal;

A/D converter means for converting the selected analog signal into a digital signal in response to a conversion start signal, said converter means generating a conversion finish signal upon completion of the conversion;

storage means for holding said converted digital signal in response to a latch signal, the storage means comprising a plurality of registers corresponding to said plurality of analog signals, each one of said plurality of registers for holding a corresponding converted digital signal, the latch signal being received at the register corresponding to the selected analog signal;

a plurality of trigger signal input terminals for respectively receiving a plurality of trigger signals, each one trigger signal being representative of selection information and timing information for a corresponding one of said analog signals;

control means coupled to said plurality of trigger signal input terminals for generating said selection signal in response to the selection information of one of said plurality of trigger signals and for generating said conversion start signal in response to the timing information of said one of said plurality of trigger signals, said control means receiving said conversion finish signal from said A/D converter means, and generating, in response to said converter finish signal, said latch signal.

2. A microcomputer receiving a plurality of analog signals to be converted to digital signals, the microcomputer having a central processing unit for accessing the digital signals, the microcomputer comprising:

a plurality of analog signal input terminals at which the respective analog signals are received;

selection means for selecting one of the received analog signals in response to a selection signal;

A/D converter means for converting the selected analog signal into a digital signal in response to a conversion start signal, said converter means generating a conversion finish signal upon completion of the conversion;

storage means comprising a first register for holding said converted digital signal in response to a latch signal and a second register for storing said selection signal;

a trigger signal input terminal for receiving a trigger signal;

a selection information input terminal for receiving selection information; and control means coupled to said trigger signal input terminal and said selection information input terminal for generating said conversion start signal in response to said trigger signal and for generating said selection signal in response to said selection information, said selection signal being output to said selecting means and to said selection information register, said control means receiving said conversion finish signal from said A/D converter means, and generating said latch signal in response to said converter finish signal.

3. A microcomputer receiving a plurality of analog signals to be converted to digital signals, the microcomputer having a central processing unit for accessing the digital signals, the microcomputer comprising:

a plurality of analog signal input terminals at which the respective analog signals are received;

selection means for selecting one of the received analog signals in response to a selection signal;

A/D converter means for converting the selected analog signal into a digital signal in response to a conversion start signal, said converter means generating a conversion finish signal upon completion of the conversion;

storage means comprising a first register for holding said converted digital signal in response to a latch signal and a second register for storing said selection signal;

a trigger signal input terminal for receiving a trigger signal;

a counter set input terminal for receiving a counter set signal;

control means having a counter for receiving said counter set signal and said trigger signal, said counter for outputting said select signal to said selection means and said selection information register, said counter set signal initializing said counter, said counter switching in a predetermined period and predetermined order in response to the trigger signal to vary the select signal, said counter responsive to said trigger signal to output said conversion start signal to said A/D converter means and said latch signal to said first register, said control means receiving said conversion finish signal from said A/D converter means and generating in response said latch signal.

4. A microcomputer receiving a plurality of analog signals to be converted to digital signals, the microcomputer having a central processing unit for accessing the digital signals, the microcomputer comprising:

a plurality of analog signal input terminals at which the respective analog signals are received;

selection means for selecting one of the received analog signals in response to a selection signal;

A/D converter means for converting the selected analog signal into a digital signal in response to a programmably-delayed conversion start signal, said converter means generating a conversion finish signal upon completion of the conversion;

storage means for holding said converted digital signal in response to a latch signal;

a plurality of trigger signal input terminals for respectively receiving a plurality of trigger signals, each one trigger signal being representative of selection information and timing information for a corresponding one of said analog signals;

control means receiving said trigger signals and generating in response to at least one of said trigger signals said selection signal and a converter start signal; and a timer programmably set by the central processing unit to store delay information, said timer delaying said converter start signal causing said converter means to receive said programmably-delayed converter start signal.

* * * * *